United States Patent
Wang et al.

(10) Patent No.: US 8,213,448 B2
(45) Date of Patent: Jul. 3, 2012

(54) METHOD TO SUPPORT LOSSLESS REAL TIME DATA SAMPLING AND PROCESSING ON RAPID I/O END-POINT

(75) Inventors: Chi-Lie Wang, Milpitas, CA (US); Jason Z. Mo, Fremont, CA (US); Calvin Nguyen, San Jose, CA (US); Bertan Tezcan, San Jose, CA (US)

(73) Assignee: Integrated Device Technology, inc., San Jose, CA (US)

( * ) Notice: Subject to any disclaimer, the term of this patent is extended or adjusted under 35 U.S.C. 154(b) by 771 days.

(21) Appl. No.: 12/043,944

(22) Filed: Mar. 6, 2008

(65) Prior Publication Data
US 2009/0225770 A1    Sep. 10, 2009

(51) Int. Cl.
*H04L 12/54* (2006.01)
(52) U.S. Cl. ........ 370/429; 370/389; 370/466; 370/467; 370/473
(58) Field of Classification Search .......... 370/352–503; 709/203–250
See application file for complete search history.

(56) References Cited

U.S. PATENT DOCUMENTS

| | | | |
|---|---|---|---|
| 4,214,305 A | 7/1980 | Tokita et al. | |
| 4,335,277 A | 6/1982 | Puri | |
| 4,782,485 A * | 11/1988 | Gollub | 370/477 |
| 4,866,704 A * | 9/1989 | Bergman | 370/452 |
| 5,018,136 A * | 5/1991 | Gollub | 370/471 |
| 5,107,489 A | 4/1992 | Brown et al. | |
| 5,245,704 A | 9/1993 | Weber et al. | |
| 5,257,384 A | 10/1993 | Farrand et al. | |
| 5,313,454 A * | 5/1994 | Bustini et al. | 370/231 |
| 5,426,643 A * | 6/1995 | Smolinske et al. | 370/506 |
| 5,530,902 A | 6/1996 | McRoberts et al. | |
| 5,572,697 A | 11/1996 | Chevalier et al. | |
| 5,655,140 A | 8/1997 | Haddock | |
| 5,717,883 A | 2/1998 | Sager | |
| 5,777,547 A | 7/1998 | Waldrop | |
| 5,916,309 A * | 6/1999 | Brown et al. | 710/52 |
| 5,924,112 A | 7/1999 | Barber et al. | |
| 5,951,706 A | 9/1999 | Benner | |
| 5,983,301 A * | 11/1999 | Baker et al. | 710/113 |

(Continued)

OTHER PUBLICATIONS

Mercury Computer Systems, Inc. article entitled: "Serial Rapid IO-to-PCIe Bridge IP Core Available for Both ASICs and FPGAs ..." dated Oct. 30, 2006; 2 pages.

(Continued)

*Primary Examiner* — Ayaz Sheikh
*Assistant Examiner* — Venkatesh Haliyur
(74) *Attorney, Agent, or Firm* — Bever, Hoffman & Harms LLP

(57) ABSTRACT

A serial buffer monitors an incoming stream of packets to identify single missing packets and multiple consecutive missing packets. Upon detecting multiple consecutive missing packets, an interrupt is generated, thereby stopping the data transfer. Upon detecting a single missing packet, a single missing packet identifier is inserted into the packet header of the packet that resulted in identification of the single missing packet. The incoming packets, including any inserted single missing packet identifiers, are written to a queue. When the water level reaches the water mark of the queue, the stored packets are read to create an outgoing packet stream. When a packet read from the queue includes an inserted single missing packet identifier, a dummy packet (e.g., a packet having a data payload of all zeros) is inserted into the outgoing packet stream. As a result, real-time applications are capable of processing the outgoing packet stream in a constant fashion.

15 Claims, 5 Drawing Sheets

U.S. PATENT DOCUMENTS

| | | | |
|---|---|---|---|
| 6,046,817 A * | 4/2000 | Brown et al. | 358/1.16 |
| 6,047,319 A | 4/2000 | Olson | |
| 6,061,089 A * | 5/2000 | Tonkin et al. | 348/211.6 |
| 6,084,631 A * | 7/2000 | Tonkin et al. | 348/211.6 |
| 6,157,621 A * | 12/2000 | Brown et al. | 370/310 |
| 6,233,629 B1 | 5/2001 | Castellano | |
| 6,271,866 B1 | 8/2001 | Hancock et al. | |
| 6,333,938 B1 * | 12/2001 | Baker | 370/503 |
| 6,347,344 B1 | 2/2002 | Baker et al. | |
| 6,425,021 B1 | 7/2002 | Ghodrat et al. | |
| 6,442,687 B1 | 8/2002 | Savage | |
| 6,510,138 B1 * | 1/2003 | Pannell | 370/236 |
| 6,546,496 B1 | 4/2003 | Wang et al. | |
| 6,564,271 B2 | 5/2003 | Micalizzi, Jr. et al. | |
| 6,581,175 B1 | 6/2003 | Crump et al. | |
| 6,631,429 B2 | 10/2003 | Cota-Robles et al. | |
| 6,636,483 B1 * | 10/2003 | Pannell | 370/236 |
| 6,658,477 B1 * | 12/2003 | Lisitsa et al. | 709/231 |
| 6,748,020 B1 * | 6/2004 | Eifrig et al. | 375/240.26 |
| 6,862,298 B1 * | 3/2005 | Smith et al. | 370/516 |
| 6,907,479 B2 | 6/2005 | Karnstedt et al. | |
| 6,944,186 B2 * | 9/2005 | Zaun et al. | 370/487 |
| 6,985,969 B1 | 1/2006 | Cheng | |
| 6,993,602 B2 | 1/2006 | Merrill et al. | |
| 7,013,354 B1 | 3/2006 | Beck et al. | |
| 7,088,735 B1 * | 8/2006 | Reohr, Jr. et al. | 370/466 |
| 7,212,962 B2 | 5/2007 | Masushige | |
| 7,213,094 B2 | 5/2007 | Edirisoori | |
| 7,436,858 B2 * | 10/2008 | Goren et al. | 370/503 |
| 7,594,002 B1 | 9/2009 | Thorpe et al. | |
| 7,617,346 B2 * | 11/2009 | Wang et al. | 710/264 |
| 7,631,128 B1 | 12/2009 | Sgrosso et al. | |
| 7,680,944 B1 * | 3/2010 | Taghizadeh et al. | 709/230 |
| 7,707,335 B2 | 4/2010 | Lidji et al. | |
| 7,710,969 B2 | 5/2010 | Szczepanek et al. | |
| 7,764,608 B2 * | 7/2010 | Breynaert et al. | 370/230 |
| 2001/0054116 A1 | 12/2001 | Cheng | |
| 2002/0080791 A1 | 6/2002 | Sylvain | |
| 2002/0171741 A1 * | 11/2002 | Tonkin et al. | 348/211.3 |
| 2002/0181481 A1 | 12/2002 | Iny | |
| 2004/0103333 A1 | 5/2004 | Martwick et al. | |
| 2004/0225779 A1 | 11/2004 | Zhao et al. | |
| 2004/0240478 A1 * | 12/2004 | Goren et al. | 370/503 |
| 2005/0100049 A1 * | 5/2005 | Siminoff | 370/473 |
| 2005/0100114 A1 * | 5/2005 | Satagopan et al. | 375/295 |
| 2005/0135390 A1 * | 6/2005 | Anderson et al. | 370/401 |
| 2005/0144341 A1 | 6/2005 | Schmidt et al. | |
| 2005/0246424 A1 | 11/2005 | Panec et al. | |
| 2005/0254518 A1 | 11/2005 | Fujimori | |
| 2005/0283598 A1 | 12/2005 | Gaskins et al. | |
| 2006/0018329 A1 * | 1/2006 | Nielsen et al. | 370/401 |
| 2006/0056435 A1 | 3/2006 | Biran et al. | |
| 2006/0153238 A1 | 7/2006 | Bar-On et al. | |
| 2006/0224812 A1 | 10/2006 | Kapoor et al. | |
| 2006/0251088 A1 | 11/2006 | Thubert et al. | |
| 2007/0050564 A1 | 3/2007 | Gunna et al. | |
| 2007/0110046 A1 * | 5/2007 | Farrell et al. | 370/389 |
| 2007/0130410 A1 | 6/2007 | Keller et al. | |
| 2007/0230403 A1 | 10/2007 | Douglas et al. | |
| 2008/0008211 A1 | 1/2008 | Zilbershtein et al. | |
| 2008/0082840 A1 | 4/2008 | Kendall et al. | |
| 2008/0096433 A1 | 4/2008 | Bixler et al. | |
| 2008/0205422 A1 * | 8/2008 | Wang et al. | 370/412 |
| 2008/0205438 A1 * | 8/2008 | Juan et al. | 370/465 |
| 2008/0209084 A1 * | 8/2008 | Wang et al. | 710/22 |
| 2008/0209089 A1 * | 8/2008 | Mo et al. | 710/71 |
| 2008/0301327 A1 | 12/2008 | Archer et al. | |
| 2009/0052323 A1 * | 2/2009 | Breynaert et al. | 370/235 |
| 2009/0086751 A1 * | 4/2009 | Wang et al. | 370/419 |
| 2009/0181663 A1 * | 7/2009 | Hu et al. | 455/422.1 |
| 2009/0225770 A1 * | 9/2009 | Wang et al. | 370/412 |
| 2009/0292935 A1 | 11/2009 | Hallnor et al. | |
| 2010/0111526 A1 * | 5/2010 | Bader | 398/45 |

OTHER PUBLICATIONS

RapidIO Interconnect Specification, Part VI: Physical Layer 1x/4x LP Serial Specification, Rev. 1.2, Jun. 2002.

* cited by examiner

METHOD TO SUPPORT LOSSLESS REAL TIME DATA SAMPLING AND PROCESSING ON RAPID I/O END-POINT

RELATED APPLICATIONS

The present application is related to, and incorporates by reference, the following commonly owned, co-filed U.S. Patent Applications: Ser. No. 12/043,918 filed by Chi-Lie Wang and Jason Z. Mo on Mar. 6, 2008, entitled "Method To Support Flexible Data Transport On Serial Protocols"; Ser. No. 12/043,929 also filed by Chi-Lie Wang and Jason Z. Mo on Mar. 6, 2008, entitled "Protocol Translation In A Serial Buffer"; Ser. No. 12/043,934 filed by Chi-Lie Wang and Jason Z. Mo on Mar. 6, 2008, entitled "Serial Buffer To Support Reliable Connection Between Rapid I/O End-Point And FPGA Lite-Weight Protocols"; Ser. No. 12/043,940 filed by Chi-Lie Wang on Mar. 6, 2008, entitled "Power Management On sRIO Endpoint"; and Ser. No. 12/043,943 filed by Chi-Lie Wang and Jason Z. Mo on Mar. 6, 2008, entitled "Serial Buffer To Support Rapid I/O Logic Layer Out Of Order Response With Data Retransmission".

FIELD OF THE INVENTION

The present invention relates to a serial buffer that performs a data offload function, wherein packets are temporarily stored in the serial buffer, and then unloaded to an end-point that implements a real-time application.

RELATED ART

A conventional serial buffer with a serial rapid I/O (sRIO) interface is typically capable of providing data offload functions. That is, packets can be loaded into the serial buffer as temporary storage. After a programmed interval has been reached, the stored packets can be unloaded from the serial buffer onto a sRIO bus, and provided to an sRIO end-point. If the sRIO end-point implements a real-time application, data needs to be sampled at a constant interval to prevent data loss. However, this data may encounter certain errors while being transferred through the sRIO interface to the serial buffer. If these errors cannot be recovered through retransmission, packet loss may occur, which may be unacceptable for real-time applications. It would therefore be desirable to have an improved serial buffer that can compensate for such packet loss.

SUMMARY

Accordingly, the present invention provides a serial buffer that checks the memory address of each incoming packet header. If the memory address is sequential for consecutive packets, the system is functioning properly, without any missing packets. Otherwise, if there is any single packet loss (as indicated by a non-sequential memory address), a missing packet indication will be stored in the packet header while this packet is being loaded into the serial buffer. When this packet subsequently becomes the top packet to be transmitted out of the serial buffer, the missing packet indication is used to insert a packet with a zero data payload (i.e., a zero packet), thereby replacing the missing packet. This scheme allows the stored packets to be transferred out of the serial buffer at a constant interval, which will prevent any data loss for real-time applications.

If there are multiple consecutive packets missing, the system is typically experiencing a severe error. This severe error is logged by the serial buffer, which sends out a corresponding doorbell message. Under these conditions, system software is relied on to perform the needed actions for error recovery.

The present invention will be more fully understood in view of the following description and drawings.

DETAILED DESCRIPTION

Figure 1:
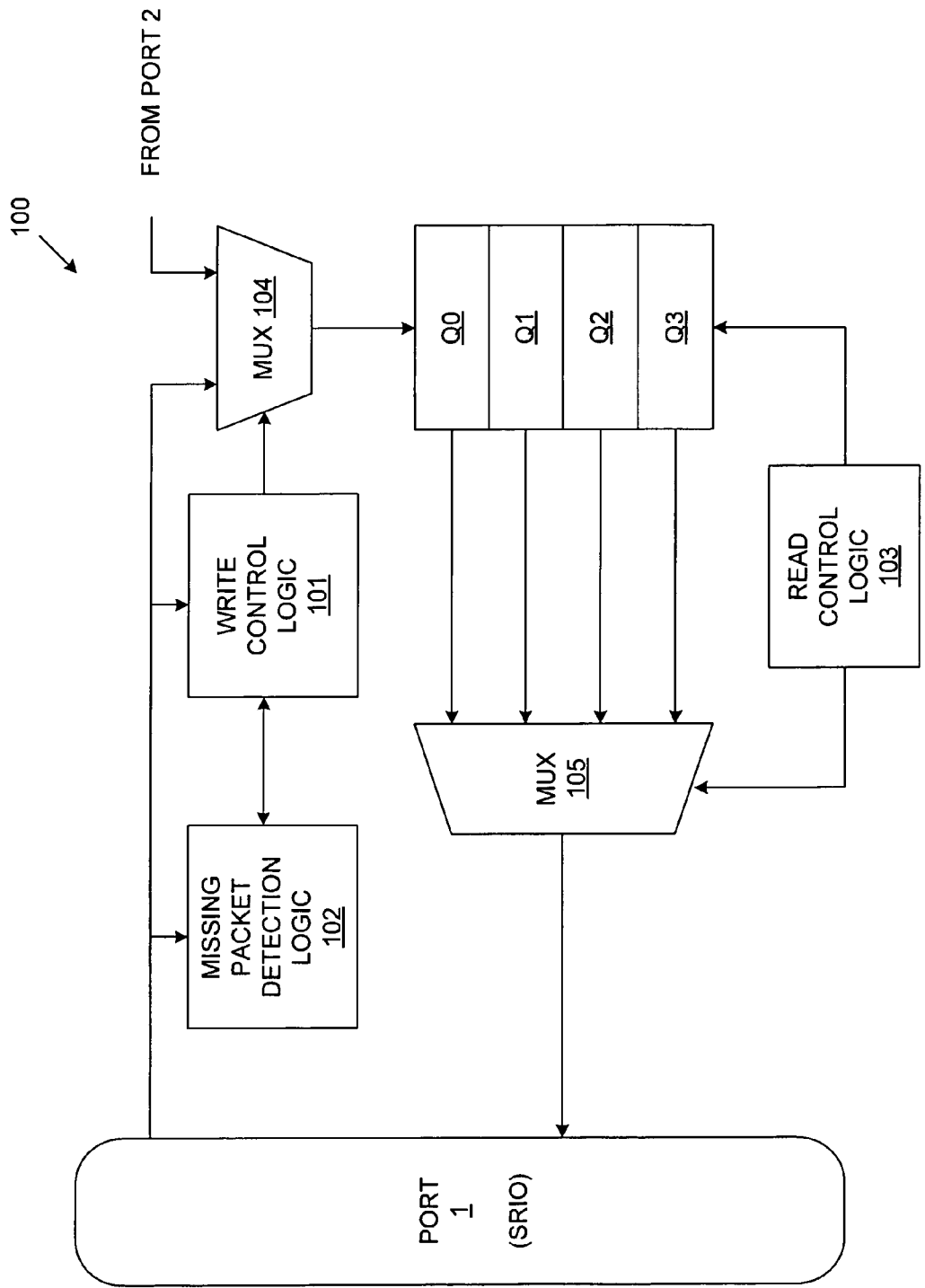
FIG. 1 is a block diagram of a serial buffer in accordance with one embodiment of the present invention.

A serial buffer is used to support lossless real-time data sampling and processing in accordance with one embodiment of the present invention. The serial buffer includes a first port (e.g., sRIO interface) that is configured to receive a sequential packet stream. A queue, which is selected from a set of queues, is used to temporarily store the received packets. Each queue is associated with a corresponding set of memory address registers, which will now be briefly described.

A start memory address register stores a start memory address value that identifies the starting memory location where a first received packet should be written in the corresponding queue.

A current memory address register stores a current memory address value that identifies the starting memory location where a currently received packet is being written in the corresponding queue.

An increment address register stores an increment address value that identifies an address difference that should exist between consecutive packets written to the corresponding queue. The address difference represented by the increment address value can be either the packet size or a multiple of the packet size. The increment address value is used for determining the next packet's start address. In the described examples, each queue is configured as a FIFO, and therefore doesn't use the incoming memory address to select each entry of the queue. Note that the increment address value can be selected such that consecutive packets are not written to a contiguous address space within the queue. The increment address value and the current address value can be added to provide a next expected memory address value, which represents the expected starting memory location of the next write operation to the corresponding queue.

A stop memory address register stores a stop memory address value that identifies the last memory location of the queue where packet data can be written.

The first packet coming into the serial buffer through the sRIO interface is processed as follows. If the memory address of the first incoming packet is equal to the start memory address value, no missing packets are detected. If the memory address of the first incoming packet is equal to the start memory address value plus the increment address value (i.e., the expected memory address of the second incoming packet), then a single missing packet is detected. If neither of the above is true, a multiple missing packet error is detected. After the first packet is received, the current memory address register is loaded with the memory address of the incoming packet. This current memory address value is added to the increment address value to derive the expected next memory address value. This expected next address value becomes the expected memory address of the next received packet (for comparison purposes).

For subsequently received packets, if the memory address of the incoming packet is equal to expected next memory address value, then no missing packet is detected. However, if the memory address of the incoming packet is equal to the expected next memory address value plus the increment memory address value, then a single missing packet is detected. However, if neither of the above is true, then a multiple missing packet error is detected. Multiple missing packet errors are reported to system software using the doorbell system of the serial buffer.

Upon reaching the stop address of the selected queue, the incoming packet memory address rolls over to the start memory address value. In order to properly perform missing packet detection, the stop memory address value is aligned at a boundary of the increment address value. Address rollover is detected when the incoming packet memory address is less than the expected next memory address value. In this case, the incoming packet memory address is adjusted by adding the total buffer size of the selected queue to the incoming packet memory address. This adjusted incoming packet memory address is used to perform the missing packet determination (i.e., is compared with the expected next memory address value) to determine whether a missing packet exists.

When a single missing packet is detected, a missing packet indication is stored in a higher unused memory bit of the associated packet header, and this modified packet header is written into the selected queue. In addition, the water level of the selected queue is incremented by two, thereby counting both the missing packet and the next received packet. When this packet header is subsequently read from the selected queue, the missing packet indication is detected, which triggers the generation of a 'zero' packet (i.e., a packet having a payload of all zero values), which is transmitted from the serial buffer in place of the missing packet. After the 'zero' packet has been sent, the next packet (i.e., the packet with the missing packet indication) is read from the selected queue. The water level of the selected queue is decremented when the zero packet is sent, and also when the next packet is sent, such that the missing packet is counted during both write and read operations. The 'zero' packet and the next packet have the same size, thereby providing a constant data stream to facilitate the proper operation of real-time applications within the device receiving the packet stream from the serial buffer.

The present invention will now be described in more detail.

FIG. 1 is a block diagram of a serial buffer 100, in accordance with one embodiment of the present invention. Serial buffer 100 includes queues Q0-Q3, a first (sRIO) port 1, a second port 2, write control logic 101, missing packet detection logic 102, read control logic 103 and packet multiplexers 104-105.

Figure 2:
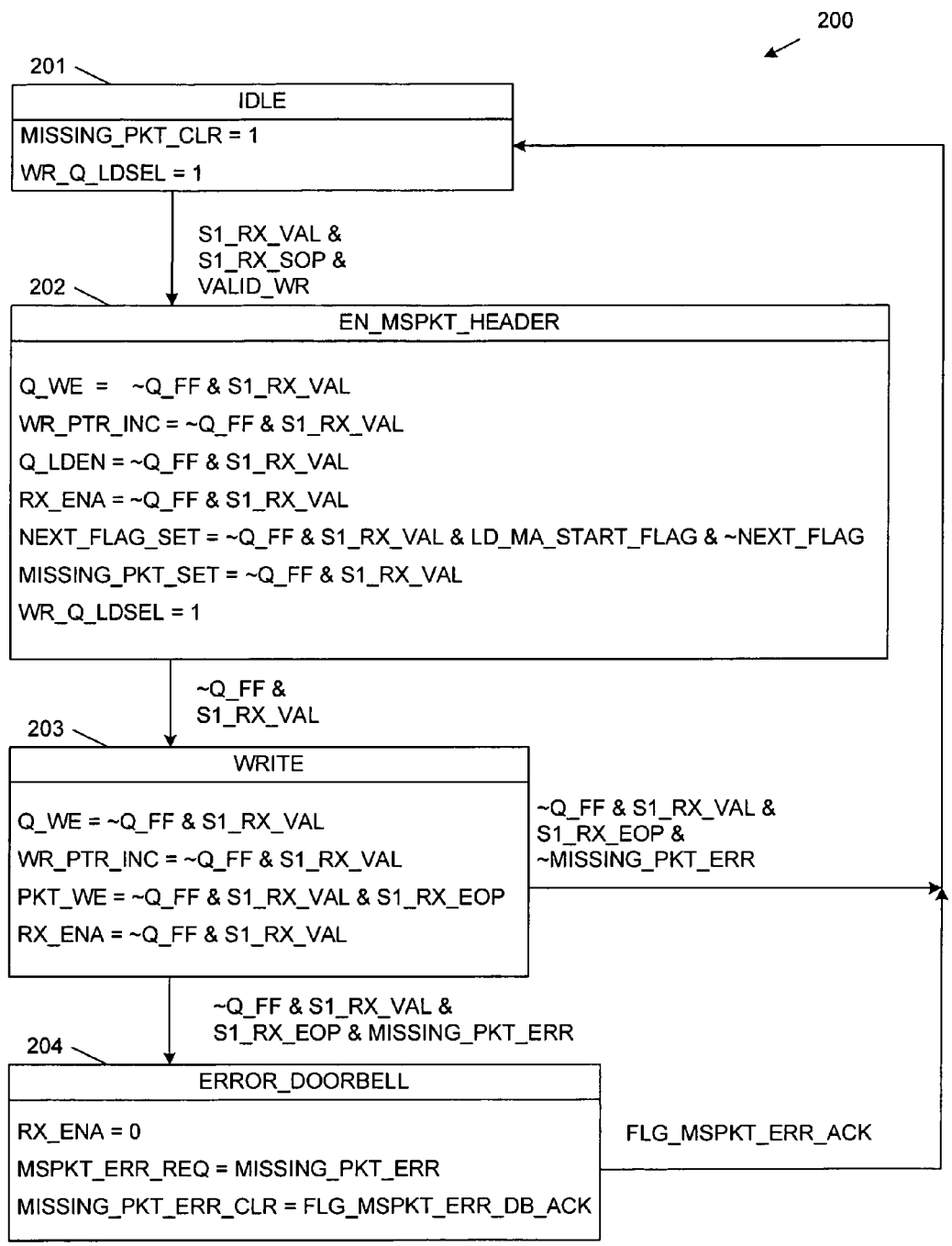
FIG. 2 is a flow diagram illustrating the operation of write control logic present in the serial buffer of FIG. 1 in accordance with one embodiment of the present invention.

FIG. 2 is a flow diagram 200 illustrating the operation of write control logic 101 in accordance with one embodiment of the present invention. Write control logic 101 is configured to receive the control information associated with write request signals provided from the first port 1. This control information includes a start-of-packet identifier S1_RX_SOP, which is activated to confirm the start of a received packet, a valid packet identifier S1_RX_VAL, which is activated to confirm the validity of the received packet, a valid write identifier VALID_WR, which is activated to confirm the validity of an associated write request, and an end-of-packet identifier S1_RX_EOP, which is activated to confirm the end of a received packet. Write control logic 101 is also configured to receive queue full flags Q_FF[3:0], which are activated to indicate that the corresponding queues Q3-Q0 are full.

Initially, write control logic 101 begins operation in an IDLE state 201. In the IDLE state 201, write control logic 101 activates the multiplexer control signal WR_Q_LDSEL to a logic '1' state. The WR_Q_LDSEL signal (along with other signals described below) enables one of the queues Q0-Q3 to be written in response to a corresponding write request received on the first port 1. The queue to be written is hereinafter referred to as the 'selected' queue. Also in the IDLE state 201, write control logic 101 activates a missing packet clear signal (MISSING_PKT_CLR) to a logic '1' state. As described in more detail below, the activated MISSING_PKT_CLR signal causes missing packet detection logic 102 to clear a single packet error indicator signal (MISSING_PKT=0).

While in the IDLE state 201, write control logic 101 monitors the received S1_RX_SOP, S1_RX_VAL, and VALID_WR control signals. Upon detecting that a packet is ready (S1_RX_SOP=S1_RX_VAL=1) and a valid write transaction has been requested (VALID_WR=1), processing proceeds to EN_MSPKT_HEADER (enable missing packet header) state 202.

Within EN_MSPKT_HEADER state 202, write control logic 101 identifies the selected queue, and then determines whether the selected queue is full by checking the corresponding queue full flag (Q_FF). Upon determining that the selected queue is not full (~Q_FF=1) and the received packet is valid (S1_RX_VAL=1), write control logic 101 performs the following operations.

Write control logic 101 activates a queue write enable signal (Q_WE=~Q_FF & S1_RX_VAL=1), a queue load enable signal (Q_LDEN=~Q_FF & S1_RX_VAL=1), and the write queue load select signal (WR_Q_LDSEL=1). In response, write control logic 101 causes the packet header received from the first port 1 to be routed through multiplexer 104, and written to the selected queue. In addition, write control logic 101 activates a write pointer increment signal (WR_PTR_INC=~Q_FF & S1_RX_VAL=1) associated with the selected queue, thereby incrementing a write pointer associated with the selected queue. Write control logic 101 also activates a first port receive enable signal (RX_ENA=~Q_FF & S1_RX_VAL=1), which enables the packet data cycle to start.

Note that missing packet detection logic 102 is active in both the IDLE state 201 and the EN_MSPKT_HEADER state 202 to detect missing packets. As described in more detail below, missing packet detection logic 102 determines whether the memory address specified by the packet header of the incoming packet (i.e., the incoming packet memory address) identifies a single missing packet of the incoming packet stream (MISSING_PACKET=1), multiple consecutive missing packets of the incoming sequential packet stream (MISSING_PKT_ERROR=1), or no missing packets of the incoming sequential packet stream (MISSING_PACKET=MISSING_PKT_ERROR=0).

Within EN_MSPKT_HEADER state 202, write control logic 101 activates a MISSING_PKT_SET signal (MISSING_PKT_SET=~Q_FF & S1_RX_VAL=1). At this time, missing packet detection logic 102 has completed the above-mentioned single missing packet detection and multiple missing packet detection operations. As described in more detail below, the activated MISSING_PKT_SET signal causes missing packet detection logic 102 to store the results of the single missing packet detection operation (i.e., MISSING_PACKET is stored as MISSING_PKT), and the results of a multiple missing packet detection operation (i.e., MISSING_PKT_ERROR is stored as MISSING_PKT_ERR).

Write control logic 101 also generates a NEXT_FLAG_SET control signal, which is provided to missing packet detection logic 102. In general, the NEXT_FLAG_SET signal is activated to a logic '1' state during the processing of the first received packet header of the incoming packet stream. More specifically, the NEXT_FLAG_SET signal is activated when a load start memory address flag (generated by missing packet detection logic 102) is in an active state (LD_MA_START_FLAG=1), a next flag (also generated by missing packet detection logic 102) is in a de-activated state (NEXT_FLAG=0), the selected write queue is not full (~Q_FF=1) and the received packet is valid (S1_RX_VAL=1). If these conditions are not met, write control logic 101 deactivates the NEXT_FLAG_SET signal to a logic '0' state.

As described in more detail below, missing packet detection logic 102 uses the NEXT_FLAG_SET signal to control the state of the NEXT_FLAG signal. In general, missing packet detection logic 102 uses the NEXT_FLAG signal to determine which address values will be compared with the incoming packet memory address for purposes of determining whether a single missing packet error, a multiple missing packet error, or no missing packet error exists.

Processing proceeds from EN_MSPKT_HEADER state 202 to WRITE state 203 in response to detecting that the selected write queue is not full (~Q_FF=1) and the received packet is still valid (S1_RX_VAL=1).

Within WRITE state 203, the packet data cycle is implemented as follows. Write control logic 101 continues to activate the queue write enable signal Q_WE, the write pointer increment signal WR_PTR_INC, and the first port receive enable signal RX_ENA, as long as the selected write queue does not become full (~Q_FF=1) and the received packet remains valid (S1_RX_VAL=1). As a result, the write packet data received from the first port 1 is written to the selected queue.

Upon detecting the end of the packet data (S1_RX_EOP=1), write control logic 101 asserts a first port packet write enable signal (PKT_WE=~Q_FF & S1_RX_VAL & S1_RX_EOP=1), which increments the water level associated with the selected write queue. If the packet data written during WRITE state 203 is not associated with a multiple missing packet error (i.e., ~Q_FF & S1_RX_VAL & S1_RX_EOP & ~MISSING_PKT_ERR=1), processing returns to IDLE state 201.

However, If the packet data written during WRITE state 203 is associated with a multiple missing packet error (i.e., ~Q_FF & S1_RX_VAL & S1_RX_EOP & MISSING_PKT_ERR=1), then processing proceeds to ERROR_DOORBELL state 204. Within ERROR_DOORBELL state 204, write control logic 101 de-activates the first port receive enable signal (RX_ENA=0), thereby preventing additional packet data cycles from being initiated. Write control logic 101 also activates a first port missing packet error request signal (MSPKT_ERR_REQ=MISSING_PKT_ERR=1). In response to this activated missing packet error request signal, a flag module (not shown) of the serial buffer 100 generates a doorbell request that informs the system software of the existing multiple missing packet error condition. In response, the system software takes measures to remedy the multiple missing packet error condition, and generates a doorbell response, which activates a corresponding doorbell acknowledge flag (FLG_MSPKT_ERR_DB_ACK=1). This activated doorbell acknowledge flag activates a multiple missing packet clear signal (MISSING_PKT_ERR_CLR) to a logic '1' state. As described in more detail below, the activated MISSING_PKT_ERR_CLR signal causes missing packet detection logic 102 to clear (i.e., reset) the multiple missing packet error indicator signal (MISSING_PKT_ERR=0). Processing then returns to the IDLE state 201.

Note that the multiple missing packet errors are handled in the above-described manner because the end-point that eventually processes the packet stream read from the selected queue is not able to handle multiple missing packets.

Figure 3:
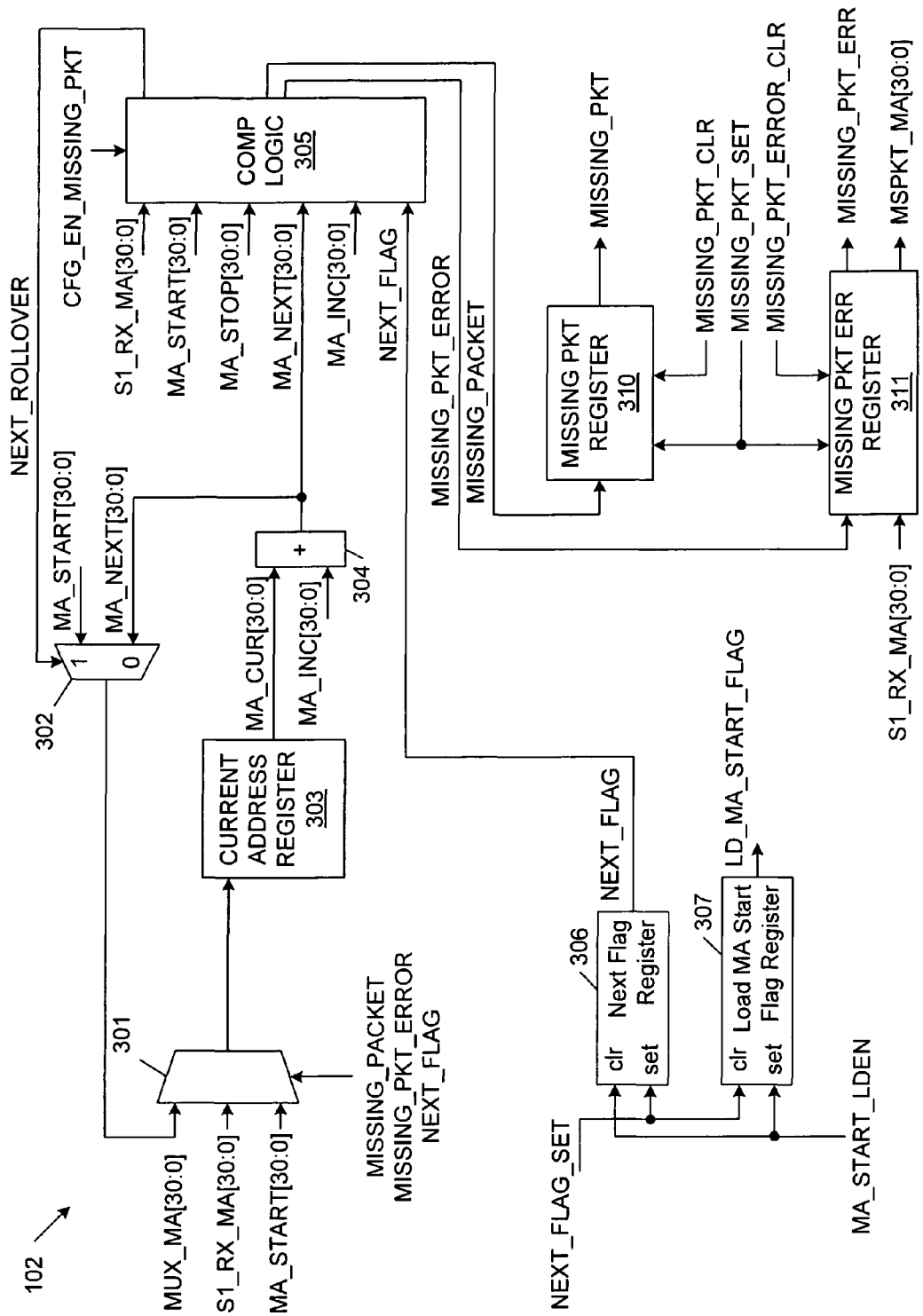
FIG. 3 is a block diagram of missing packet detection logic present in the serial buffer of FIG. 1, in accordance with one embodiment of the present invention.

FIG. 3 is a block diagram of missing packet detection logic 102 associated with the selected queue (i.e., one of queues Q0-Q3), in accordance with one embodiment of the present invention. It is understood that similar logic is provided for each of the various queues Q0-Q3.

As illustrated in FIG. 3, missing packet detection logic 102 includes multiplexers 301-302, current address register 303, addition logic 304, comparison logic 305, next flag register 306, load start memory address flag register 307, single missing packet register 310 and multiple missing packet error register 311.

Comparison logic 305 receives the incoming packet memory address (S1_RX_MA[30:0]) from the packet header of each packet received from the first port 1. This incoming packet memory address identifies the starting address in the selected queue where the associated packet is to be written.

Comparison logic 305 also receives a starting memory address (MA_START[30:0]) that identifies the first address location where a packet header can be written in the selected queue. In addition, comparison logic 305 receives a stop memory address (MA_STOP[30:0]) that identifies the last address location where packet data can be written in the selected queue. Comparison logic 305 also receives an address increment value (MA_INC[30:0]) that identifies the address difference between consecutive packets to be written to the selected queue. As described above, the address increment value may represent the size of a single packet or the size of multiple packets. Each of the queues Q0-Q3 has its own corresponding start memory address, stop memory address and address increment value (although only the values associated with the selected queue are illustrated in FIG. 3 for reasons of clarity). The start memory address MA_START [30:0], the stop memory address MA_STOP[30:0], and the address increment value MA_INC[5:0] associated with each of queues Q0-Q3 may be stored in corresponding registers (not shown) within serial buffer 100. Queue write select logic (not shown) selectively routes the start memory address, stop memory address and address increment value associated with the selected queue to comparison logic 305.

Comparison logic 305 also receives a missing packet detection enable signal (CFG_EN_MISSING_PKT), which is asserted to a logic '1' value to enable missing packet detection for the selected queue. Although each of the queues Q0-Q3 has a corresponding missing packet detection enable signal, only the value associated with the selected queue is illustrated in FIG. 3 for reasons of clarity). Queue write select logic (not shown) selectively routes the missing packet detection enable signal associated with the selected queue to comparison logic 305.

Comparison logic 305 also receives the NEXT_FLAG value provided by next flag register 306, and an expected next memory address MA_NEXT[30:0] provided by addition logic 304.

As described in more detail below, comparison logic 305 uses these received values to generate a MISSING_PACKET indicator, which is activated when a single missing packet is detected, and a MISSING_PKT_ERROR indicator, which is activated when multiple consecutive missing packets are detected.

The MISSING_PACKET indicator is provided to single missing packet register 310, and is used to provide the single missing packet error signal, MISSING_PKT. The single missing packet register 310 can be cleared (to provide a logic '0' MISSING_PKT signal) by asserting the MISSING_PKT_CLR signal to a logic '1' state. As described above, the MISSING_PKT_CLR signal is asserted to clear the missing packet register 310 prior to processing each received packet header. (See, FIG. 2, IDLE state 201.)

In addition, the single missing packet register 310 can be controlled to latch the MISSING_PACKET indicator by asserting the MISSING_PKT_SET signal to a logic '1' state. As described above, the MISSING_PKT_SET signal is asserted such that the MISSING_PACKET indicator is latched in the single missing packet register 310 each time that a received packet header is processed. (See, FIG. 2, EN_MSPKT_HEADER state 202.) As described in more detail below, the MISSING_PKT signal is activated to a logic '1' state in response to detecting a single missing packet in a received packet stream. In response to the logic '1' state of the MISSING_PKT signal, a missing packet identifier is written to an unused high address location of the packet header associated with the packet that resulted in the single missing packet error. The logic '1' state of the MISSING_PKT signal also causes the water level of the selected queue to be incremented by two (rather than one), thereby enabling the missing packet to be effectively counted.

The MISSING_PKT_ERROR indicator is provided to multiple missing packet error register 311, and is used to provide the multiple missing packet error signal, MISSING_PKT_ERR. The multiple missing packet error register 311 can be cleared (to provide a logic '0' MISSING_PKT_ERR signal) by asserting the MISSING_PKT_ERROR_CLR signal to a logic '1' state. As described above, the system software asserts the MISSING_PKT_ERROR_CLR signal to clear the multiple missing packet error register 310 each time that the system software has finished remedying a multiple missing packet condition. (See, FIG. 2, ERROR_DOORBELL state 204.)

In addition, the multiple missing packet error register 311 can be controlled to latch the MISSING_PKT_ERROR indicator by asserting the MISSING_PKT_SET signal to a logic '1' state. As described above, the MISSING_PKT_SET signal is asserted such that the MISSING_PKT_ERROR indicator is latched in the multiple missing packet error register 311 each time that a received packet header is processed. (See, FIG. 2, EN_MSPKT_HEADER state 202.)

Note that the multiple missing packet error register 311 is also configured to receive the incoming packet memory address, S1_RX_MA[30:0]. The multiple missing packet error register 311 is controlled to latch this incoming packet memory address S1_RX_MA[30:0] when the MISSING_PKT_SET signal is asserted to a logic '1' state. Multiple missing packet error register 311 outputs this latched incoming packet memory address as the missing packet memory address MSPKT_MA[30:0]. This missing packet memory address MSPKT_MA[30:0] is provided to the system software in the missing packet error doorbell requests generated in ERROR_DOORBELL state 204 (FIG. 2).

Next flag register 306 has a set terminal coupled to receive the NEXT_FLAG_SET value (described above in connection with EN_MSPKT_HEADER state 202 of FIG. 2), and a clear terminal coupled to receive a MA_START_LDEN signal. Similarly, load memory address start flag register 307 has a clear terminal coupled to receive the NEXT_FLAG_SET value, and a set terminal coupled to receive the MA_START_LDEN signal. Each of the queues Q0-Q3 has its own corresponding next flag register and load memory address start flag register (although only the next flag register and load memory address start flag register associated with the selected queue are illustrated in FIG. 3 for reasons of clarity). In one embodiment, the next flag register and load memory address start flag register associated with the selected queue are accessed through a priority packet with decoded command for register write/read operations.

Serial buffer 100 activates the MA_START_LDEN signal by performing a software write to the start address register associated with the selected queue. As a result, the next flag register 305 associated with the selected queue is cleared (NEXT_FLAG=0) and the load memory address start flag register 307 associated with the selected queue is set (LD_MA_START_FLAG=1). Serial buffer 100 de-activates the MA_START_LDEN signal after the software write to the start address register is completed.

As described above, upon receiving the header of the first packet of the data transfer, the NEXT_FLAG_SET value will transition to a logic '1' state. (FIG. 2, EN_MSPKT_HEADER state 202.) As a result, the next flag register 305 associated with the selected queue is set (NEXT_FLAG=1) and the load memory address start flag register 307 associated with the selected queue is cleared (LD_MA_START_FLAG=0).

Multiplexer 301 is configured to receive the incoming packet memory address S1_RX_MA[30:0], the memory start address MA_START[30:0] and a multiplexed memory address MUX_MA[30:0]. The multiplexed memory address MUX_MA[30:0] is provided by multiplexer 302, which routes either the memory start address MA_START[30:0] or the next expected memory address MA_NEXT[30:0] in response to a NEXT_ROLLOVER signal provided by comparison logic 305.

Multiplexer 301 operates as follows during write operations to the selected queue. If there are no missing packets detected by comparison logic 305 (MISSING_PACKET=MISSING_PKT_ERROR=0), and the packet being written is the first packet of the data transfer (NEXT_FLAG=0), then multiplexer 301 routes the memory start address MA_START[30:0] of the selected queue. If there are no missing packets detected by comparison logic 305 (MISSING_PACKET=MISSING_PKT_ERROR=0), and the packet being written is the not the first packet of the data transfer (NEXT_FLAG=1), then multiplexer 301 routes the multiplexed memory address MUX_MA[30:0]. If there is a missing packet detected by comparison logic 305 (MISSING_PACKET or MISSING_PKT_ERROR=1), then multiplexer 301 routes the incoming packet memory address S1_RX_MA[30:0]. The reasons for this routing are described in more detail below.

The memory address routed by multiplexer 301 is loaded into the current memory address register 303 of the selected queue in response to the queue load enable signal Q_LDEN activated during EN_MSPKT_HEADER state 202). Each of the queues Q0-Q3 has its own corresponding current memory address register (although only the current memory address register associated with the selected queue is illustrated in FIG. 3 for reasons of clarity). The memory address stored in current memory address register 303 is provided to addition logic 304 as the current memory address MA_CUR[30:0].

Addition logic 304 adds the received current memory address MA_CUR[30:0] to the address increment value MA_INC[30:0], thereby creating the expected next address value MA_NEXT[30:0]. Assuming that there are no missing packets and that the current packet is not being written to the stop address location MA_STOP[30:0] of the selected queue, the expected next address value MA_NEXT[30:0] should accurately predict the incoming packet memory address S1_RX_MA[30:0] of the next received packet.

The operation of comparison logic 305 will now be described in more detail. If the configuration enable missing packet indicator associated with any of the queues Q0-Q3 is activated (|CFG_EN_MISSING_PKT[3:0]=1), comparison logic 305 activates an enable missing packet signal (EN_MSPKT=1). The activated enable missing packet signal enables the generation of the missing packet indicators (MISSING_PACKET and MISSING_PKT_ERROR) within comparison logic 305.

Comparison logic 305 calculates the total buffer size (TOTAL_BUF_SIZE) of the selected queue by adding one to the difference between the memory start address and the memory stop address of the selected write queue (TOTAL_BUF_SIZE=MA_STOP[30:0]−MA_START[30:0]+1).

Comparison logic 305 also generates the NEXT_ROLLOVER value, which is used to control multiplexer 302. In general, the NEXT_ROLLOVER value is only activated when write operations to the selected queue wrap around (rollover) from the last address location (MA_STOP[30:0]) of the selected queue to the first address location (MA_START[30:0]) of the selected queue. However, the NEXT_ROLLOVER value should not be activated when the first packet of a data transfer is being written to the selected queue.

Under rollover conditions, the incoming packet memory address S1_RX_MA[30:0] (which should equal MA_START[30:0]) will be less than the expected next memory address (MA_NEXT[30:0]). However, under non-rollover conditions, the incoming packet memory address S1_RX_MA[30:0] will either be equal to the expected next memory address MA_NEXT[30:0] (if there are no missing packets), or greater than the expected next memory address MA_NEXT[30:0] (if there are one or more missing packets). Accordingly, the logic for generating the NEXT_ROLLOVER value can be stated as follows:

NEXT_ROLLOVER=NEXT_FLAG & (S1_RX_MA<MA_NEXT)

Thus, the NEXT_ROLLOVER value will be asserted to a logic '1' state only when rollover conditions exist (S1_RX_MA<MA_NEXT) and the incoming packet is not the first packet of a data transfer (NEXT_FLAG=1). Under these conditions, multiplexer 302 will route the memory start address MA_START[30:0] to multiplexer 301. As long as no missing packets are detected by comparison logic 305, multiplexer 301 will route the memory start address MA_START[30:0] received from multiplexer 302 to current memory address register 303, thereby allowing the current memory address register 303 to be loaded with the memory start address MA_START[30:0] during the above-described rollover conditions.

Note that when the NEXT_ROLLOVER value is de-asserted to a logic '0' state, multiplexer 302 routes the expected next memory address MA_NEXT[30:0] to multiplexer 301.

Comparison logic 305 also uses the NEXT_ROLLOVER value to generate an incoming memory address value (INCOMING_MA[30:0]), which is used internally within comparison logic 305 to generate the missing packet indicators (MISSING_PACKET and MISSING_PKT_ERROR). Comparison logic 305 generates the incoming memory address value (INCOMING_MA[30:0]) as follows. If the NEXT_ROLLOVER value is de-activated to a logic '0' state, then comparison logic 305 sets the incoming memory address value (INCOMING MA[30:0]) equal to the incoming packet memory address (S1_RX_MA[30:0]). However, if the NEXT_ROLLOVER value is activated to a logic '1' state, then comparison logic 305 sets the incoming memory address value (INCOMING MA[30:0]) equal to the incoming packet memory address (S1_RX_MA[30:0]) plus the TOTAL_BUF_SIZE value. The generation of the incoming memory address value (INCOMING_MA[30:0]) can therefore be represented by the following logic.

INCOMING_MA=(NEXT_ROLLOVER)?S1_RX_MA+TOTAL_BUF_SIZE: S1_RX_MA

Comparison logic 305 uses the incoming memory address value (INCOMING_MA[30:0]) to generate the MISSING_PACKET signal in the manner represented by the following logic.

MISSING_PACKET =
  EN_MSPKT & Q_WR_SEL) &
  (~NEXT_FLAG & S1_RX_MA == (MA_START + MA_INC)|
  NEXT_FLAG & (INCOMING_MA == (MA_NEXT + MA_INC))

The MISSING_PACKET logic set forth above will now be described. If the enable missing packet signal is activated (EN_MSPKT=1), and a write operation to the selected queue is enabled (Q_WR_SEL=1), then comparison logic 305 will activate the single missing packet indicator MISSING_PACKET to a logic '1' state if the received packet is the first packet of a data transfer (i.e., NEXT_FLAG=0), but the incoming packet memory address (S1_RX_MA[30:0]) represents the second address of the selected queue (i.e., MA_START[30:0]+MA_INC[30:0]). Note that the first packet of a data transfer should have an incoming packet memory address S1_RX_MA[30:0] equal to the first address of the selected queue, or MA_START[30:0]. Thus, when the incoming packet memory address S1_RX_MA[30:0] of the first packet of a data transfer is equal to the second address of the selected queue (i.e., MA_START[30:0]+MA_INC[30:0]), a single missing packet is properly detected.

If the enable missing packet signal is activated (EN_MSPKT=1), a write operation to the selected queue is enabled (Q_WR_SEL=1), the received packet is not the first packet of a data transfer (NEXT_FLAG=1), and a rollover condition does not exist (NEXT_ROLLOVER=0) then comparison logic 305 will activate the single missing packet indicator MISSING_PACKET to a logic '1' state if the incoming packet memory address (S1_RX_MA[30:0]) is greater than the expected next memory address (MA_NEXT[30:0]) by exactly one address increment value (MA_INC[30:0]). Note that under these conditions, the incoming packet memory address (S1_RX_MA[30:0]) should be equal to the expected next memory address, MA_NEXT[30:0]. Thus, under these conditions, a single missing packet is properly detected when the incoming packet memory address (S1_RX_MA[30:0]) is equal to the expected next memory address (MA_NEXT[30:0]) plus the address increment value (MA_INC[30:0]).

If the enable missing packet signal is activated (EN_MSPKT=1), a write operation to the selected queue is enabled (Q_WR_SEL=1), the received packet is not the first packet of a data transfer (i.e., NEXT_FLAG=1), and a rollover condition does exist (NEXT_ROLLOVER=1) then comparison logic 305 will activate the single missing packet indicator MISSING_PACKET to a logic '1' state if the incoming packet memory address (S1_RX_MA[30:0]) plus the total buffer size (TOTAL_BUF_SIZE) is greater than the expected next memory address (MA_NEXT[30:0]) by exactly one address increment value (MA_INC[30:0]). Note that under these conditions, the expected next memory address (MA_NEXT[30:0]) is equal to the memory stop address plus one (MA_STOP[30:0]+1). This condition is achieved by selecting the size of the queue such that the queue is capable of storing exactly N packets, wherein N is an integer (i.e., a packet boundary will correspond with the queue boundary). The expected address value of a single missing packet can therefore be represented by adding the memory increment value MA_INC[30:0] to the expected next memory address (MA_STOP[30:0]+1), which results in (MA_STOP[30:0]+1+MA_INC[30:0]).

Under the above-described rollover conditions, the incoming packet memory address (S1_RX_MA[30:0]) should be equal to the starting memory address (MA_START[30:0]). Thus, a single missing packet would be represented by an actual incoming packet memory address equal to (MA_START[30:0]+MA_INC[30:0]). Adding TOTAL_BUF_SIZE to the actual incoming memory address enables a meaningful comparison with the expected address values described in the paragraph above. In this case, an actual single missing packet is represented by (MA_START[30:0]+MA_INC[30:0]+TOTAL_BUF_SIZE). Substituting for TOTAL_BUF_SIZE results in (MA_START[30:0]+MA_INC[30:0]+MA_STOP[30:0]−MA_START[30:0]+1), or (MA_STOP[30:0]+1+MA_INC[30:0]), which corresponds with the expected address value of a single missing packet, as defined in the paragraph above. Thus, under these conditions, a single missing packet is properly detected when the incoming packet memory address (S1_RX_MA[30:0]) plus the capacity of the selected queue (TOTAL_BUF_SIZE) is equal to the expected next memory address (MA_STOP[30:0]+1) plus the address increment value (MA_INC[30:0]).

In this manner, comparison logic 305 activates the MISSING_PACKET indicator to a logic '1' state each time that a single missing packet is identified in the incoming packet stream.

Comparison logic 305 uses the single missing packet indicator (MISSING_PACKET) to generate the multiple missing packet error indicator (MISSING_PKT_ERROR) in the manner represented by the following logic:

```
MISSING_PKT_ERROR =
    EN_MSPKT & Q_WR_SEL) &
    (~MISSING_PACKET & ~(~NEXT_FLAG &
    (S1_RX_MA == MA_START)|
    NEXT_FLAG & (INCOMING_MA == MA_NEXT)))
```

The MISSING_PKT_ERROR logic set forth above will now be described. The MISSING_PKT_ERROR signal is only activated to a logic '1' state if the enable missing packet signal is activated (EN_MSPKT=1), a write operation to the selected queue is enabled (Q_WR_SEL=1), a single missing packet error has not been detected (MISSING_PACKET=0), and the incoming memory address (i.e., S1_RX_MA[30:0] or INCOMING_MA[30:0]) does not equal the expected next memory address value (i.e., MA_START[30:0] or MA_NEXT[30:0]). Otherwise the MISSING_PKT_ERROR signal is deactivated to a logic '0' state.

Figure 4:
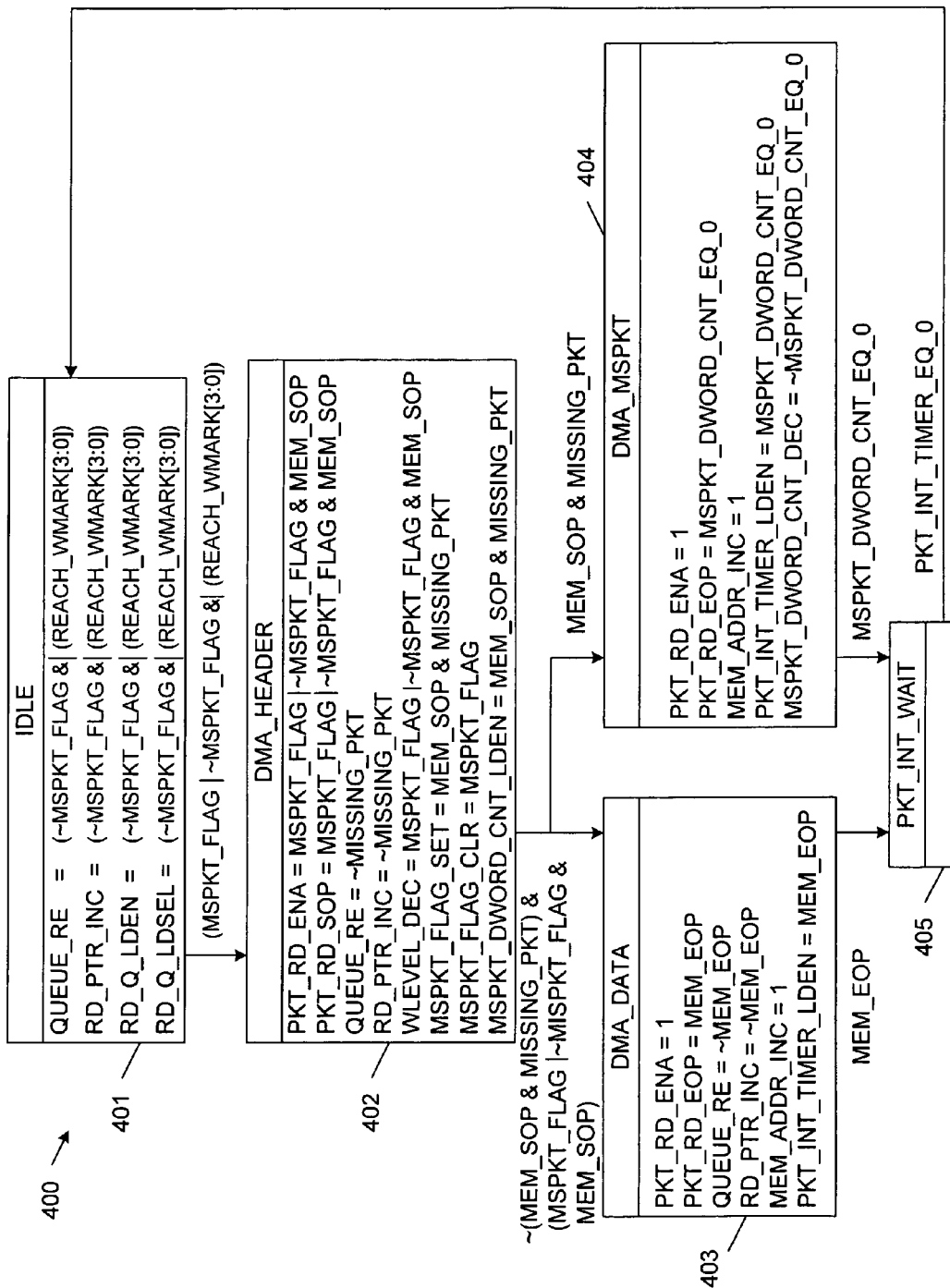
FIG. 4 is a flow diagram illustrating the operation of DMA read control logic present in the serial buffer of FIG. 1, in accordance with one embodiment of the present invention.

FIG. 4 is a flow diagram 400 illustrating the operation of DMA read control logic 103 in accordance with one embodiment of the present invention. Initially, read control logic 103 begins operation in an IDLE state 401. A missing packet flag (MSPKT_FLAG), which is used to identify the presence of a single missing packet detected during a read operation, is initially cleared to a logic '0' state. If the water level of any one of the four queues Q0-Q3 reaches its associated water mark (|REACH_WMARK[3:0]=1) and the missing packet flag is cleared (MSPKT_FLAG=0), then associated queue read enable signal will be asserted (QUEUE_RE=1) to enable the packet header to be read (pre-fetched) from the first memory location of the corresponding (selected) queue. In addition, read control logic 103 increments the read pointer of the selected read queue by activating an associated read counter increment signal (RD_PTR_INC=1). At this time, the read pointer points to the first data value of the first data packet in the selected read queue. Read control logic 103 also latches the selected queue (RD_Q_LDEN=1), and enables early queue selection while in the IDLE state 401 (RD_Q_LDSEL=1). Note that if multiple queues have water levels that reach their corresponding water marks, the queue having the highest priority is processed first. Processing then proceeds to DMA_HEADER state 402.

In the DMA_HEADER state 402, the pre-fetched packet header is transferred to the first port. If the start-of-packet indicator associated with this pre-fetched packet header is asserted (MEM_SOP=1) and the missing packet flag is cleared (MSPKT_FLAG=0), then read control logic 103 activates a packet read enable signal (PKT_RD_ENA) to indicate that the packet header transferred to the first port is valid. Under these conditions, read control logic 103 also activates a start-of-packet read signal (PKT_RD_SOP=1) to indicate that a valid packet header is being transferred to the first port. Under these conditions, a water level decrement signal is also activated (WLEVEL_DEC=1) thereby decrementing the water level of the selected queue by one, to properly reflect the fact that a packet is being transferred to the first port 1. As described in more detail below, read control logic 103 will also activate the packet read enable signal (PKT_RD_ENA), the start-of-packet read signal (PKT_RD_SOP) and the water level decrement signal (WLEVEL_DEC) if the missing packet flag is set (MSPKT_FLAG=1).

If the pre-fetched packet header does not include an asserted single missing packet indicator (i.e., MISSING_PKT=0), then the queue read enable signal and the read counter (pointer) increment signal remain asserted (QUEUE_RE=RD_PTR_INC=~MISSING_PKT=1), thereby enabling packet data to be pre-fetched from the selected queue.

However, if the pre-fetched packet header includes an asserted single missing packet indicator (i.e., MISSING_PKT=1), then a zero packet must be transferred to the first port 1. Under these conditions, packet data is not pre-fetched from the selected queue. That is, the queue read enable signal and the read pointer increment signal are de-asserted (QUEUE_RE=RD_PTR_INC=~MISSING_PKT=0), such that packet data is not pre-fetched from the selected queue.

Also within the DMA_HEADER state 402, if the pre-fetched packet header includes an asserted single missing packet indicator (i.e., MISSING_PKT=1), and the start-of-packet read signal is asserted (MEM_SOP=1), then the missing packet flag (MSPKT_FLAG) is set to a logic '1' state by asserting a missing packet flag set signal (MSPKT_FLAG_SET=MEM_SOP & MISSING_PKT=1). The asserted missing packet flag set signal indicates that a single missing packet has been detected. If the missing packet flag set signal is asserted (MSPKT_FLAG_SET=1), the pre-fetched packet header is latched, such that this packet header can be used when sending a zero packet (DMA_MSPKT state 404, below), and then re-used when subsequently sending the following normal packet (DMA_DATA state 403, below). Moreover, if the missing packet flag set signal is asserted (MSPKT_FLAG_SET=1), a counter load enable signal is activated (MSPKT_DWORD_CNT_LDEN=MEM_SOP & MISSING_PKT=1), thereby loading a double-word count value into a corresponding countdown timer. This double-word count value identifies the number of double-words to be included in the zero packet.

Note that if the missing packet flag (MSPKT_FLAG) has a logic '1' state upon entering DMA header state 402, then the missing packet flag is cleared by asserting a missing packet flag clear signal (MSPKT_ FLAG_ CLR= MSPKT_ FLAG=1).

If a single missing packet is detected in DMA_HEADER state 402 (i.e., MEM_SOP & MISSING_PKT=1), then processing transitions to DMA_MSPKT state 404, wherein a zero packet is transmitted to the first port 1. Otherwise, processing transitions to DMA_DATA state 403, wherein a normal packet is read from the selected queue to the first port 1.

For purposes of explaining the operation of read control logic 103, it will first be assumed that a single missing packet is detected in DMA_HEADER state 402, such that processing transitions to DMA_MSPKT state 404. In this state 404, a zero packet (i.e., a packet having all logic '0' values) is transmitted to the first port 1. More specifically, read control logic 103 transmits double-words having all zero values (hereinafter, zero-value double-words) to the first port 1, until the number of zero-value double words transmitted is equal to the double-word count value previously loaded into the countdown timer in DMA_HEADER state 402. Each time that a zero-value double-word is transmitted, the double-word count value stored in the countdown timer is decremented, until the countdown timer reaches a zero value. When the countdown timer reaches a zero value (thereby indicating that all of the specified zero-value double words have been transferred to the first port 1), a countdown expiration signal is asserted (i.e., MSPKT_DWORD_ CNT_EQ_0=1). However, as long as the double-word count value stored in the countdown timer is not equal to zero, this countdown expiration signal is de-asserted (i.e., MSPKT_D-WORD_CNT_EQ_0=0). When the countdown expiration signal is asserted, read control logic 103 activates an end-of-packet indicator (PKT_RD_EOP=MSPKT_DWORD_CNT_EQ_0=1) to inform the first port 1 that the entire zero packet has been transferred.

Note that read control logic 103 activates the packet read enable signal (PKT_RD_ENA=1) during DMA_MSPKT state 404 to indicate that the zero-value double-words being transferred to the first port 1 are valid. Read control logic 103 also activates a memory address increment signal (MEM_ADDR_INC=1), to increment the host memory location to which the zero packet is being transferred.

When the countdown expiration signal is asserted, read control logic 103 also activates a packet interval timer load enable signal (PKT_INT_ TIMER_ LDEN= MSPKT_D-WORD_CNT_EQ_0=1), which loads a packet interval timer with a packet interval value. Processing then proceeds to PKT_INT_WAIT state 405 (in response to the asserted countdown expiration signal, MSPKT_DWORD_CNT_EQ_0=1).

Within PKT_INT_WAIT state 405, the packet interval timer counts down from the packet interval value each clock cycle, until this timer reaches zero (PKT_INT_TIMER_EQ_0=1). At this time, processing returns to the IDLE state 401. The packet interval value is selected to ensure that a required inter-packet gap can be maintained for back-to-back packet transfers.

In the present example, upon returning to IDLE state 401 (from DMA_MSPKT state 404), the missing packet flag is set (MSPKT_FLAG=1) from the previous visit to DMA_ HEADER state 402. In response to the set missing packet flag, processing proceeds to DMA_HEADER state 402. Note that no packet header is pre-fetched within IDLE state 401 as a result of the set missing packet flag. As described above, the previously latched pre-fetched packet header is re-used in DMA_HEADER state 402.

Upon returning to DMA_HEADER state 402 (from DMA_MSPKT state 404), the previously latched packet header is re-sent to the first port. In response to the set missing packet flag, read control logic 103 activates the packet read enable signal (PKT_RD_ENA) to indicate that the packet header transferred to the first port is valid. Under these conditions, read control logic 103 also activates the start-of-packet read signal (PKT_RD_SOP=1) to indicate that a valid packet header is being transferred to the first port. Also under these conditions, read control logic 103 activates the water level decrement signal to decrement the water level of the selected queue by one, to properly reflect the fact that another packet is being transferred to the first port 1.

Upon returning to DMA_HEADER state 402 (from DMA_MSPKT state 404), the single missing packet indicator is no longer activated (i.e., MISSING_PKT=0). Under these conditions, the queue read enable signal (QUEUE_RE) is activated (QUEUE_RE=~MISSING_PKT=1), thereby causing read control logic 103 to pre-fetch packet data from the selected queue. Also under these conditions, the read pointer increment signal is asserted (RD_PTR_INC=~MISSING_PKT=1), thereby causing read control logic 103 to increment the read pointer value of the selected queue.

Also within DMA header state 402, read control logic 103 asserts a missing packet clear signal (MSPKT_FLAG_CLR) in response to detecting that the missing packet flag is set (MSPKT_FLAG_CLR=MSPKT_FLAG). The asserted missing packet clear signal (MSPKT_FLAG_CLR) is used to clear the missing packet flag (i.e., MSPKT_FLAG=0).

Note that upon returning to DMA_HEADER state 402 (from DMA_MSPKT state 404), read control logic 103 initially determines that the missing packet flag is set (MSPKT_FLAG=1) and the single missing packet indicator is deactivated (MISSING_PKT=0). In response, read control logic 103 causes processing to proceed from DMA_HEADER state 402 to DMA_DATA state 403 (after the above-described actions are taken).

Within DMA_DATA state 403, read control logic 103 activates the packet read enable signal (PKT_RD_ENA=1) to indicate that the packet data being transferred to the first port 1 is valid. As a result, the packet data pre-fetched from the selected queue during DMA_HEADER state 402 is transferred out from the first port 1.

In addition, read control logic 103 extracts an end-of-packet identifier (MEM_EOP) from the packet data being transferred to the first port 1. This end-of-packet identifier is has a first logic state (MEM_EOP=0) if the transferred packet data is not the last data value of the associated data packet.

Conversely, this end-of-packet identifier has a second logic state (MEM_EOP=1) if the transferred packet data is the last data value of the associated data packet.

As long as the end-of-packet identifier is not activated (MEM_EOP=0), read control logic 103 continues to activate the queue read enable signal (QUEUE_RE) and the read pointer increment signal (RD_PTR_INC) associated with the selected queue, such that packet data values are sequentially read from the selected queue (i.e., QUEUE_RE=RD_PTR_INC=~MEM_EOP).

Read control logic 103 also activates the memory address increment signal (MEM_ADDR_INC=1), to increment the host memory location to which the zero packet is being transferred.

When the end-of-packet identifier is activated (MEM_EOP=1), thereby indicating the end of the packet data, read control logic 103 activates the packet read end-of-packet signal PKT_RD_EOP to inform the first port 1 that the entire data packet has been transferred (i.e., PKT_RD_EOP=MEM_EOP=1).

When the end-of-packet identifier indicates that the end of the data packet has been reached (MEM_EOP=1), read control logic 103 deactivates the queue read enable signal (QUEUE_RE=~MEM_EOP=0), such that no additional data values are pre-fetched from the selected queue. In addition, read control logic de-asserts the read pointer increment signal associated with the selected queue (RD_PTR_INC=~MEM_EOP=0), such that the associated read pointer will point to the packet header of the next data packet stored in the selected queue. Read control logic 103 also activates the packet read end-of-packet signal PKT_RD_EOP to inform the first port 1 that the last data value of the current data packet has been transferred (i.e., PKT_RD_EOP=MEM_EOP=1).

In addition, when the end-of-packet identifier is activated (MEM_EOP=1), read control logic 103 activates the packet interval timer load enable signal (PKT_INT_TIMER_LDEN=MEM_EOP=1), thereby causing the packet interval timer to be loaded with the packet interval value. Read control logic 103 causes processing to proceed from DMA_DATA state 403 to PKT_INT_WAIT state 405 in response to the activated end-of-packet identifier (MEM_EOP=1).

Within PKT_INT_WAIT state 405, the packet interval timer counts down from the packet interval value each clock cycle, until this timer reaches zero (PKT_INT_TIMER_EQ_0=1). At this time, processing returns to the IDLE state 401.

Note that if the packet header as initially read from the selected queue does not have an activated single missing packet indicator (i.e., MISSING_PKT=0), then processing will proceed from DMA_HEADER state 402 to DMA_DATA state 403, without first looping through DMA_MSPKT state 404.

In the foregoing manner, if a packet retrieved from the selected queue indicates that a single missing packet error was previously detected during the write process, then read control logic 103 causes a zero packet to be inserted before transmitting the retrieved packet. However, if there is no single missing packet error indicated, then read control logic 103 reads out the retrieved packet.

Figure 5A:
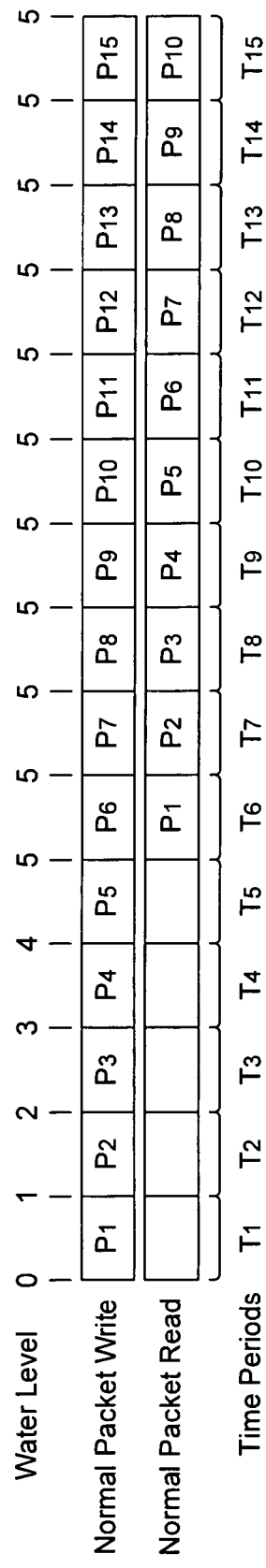
FIG. 5A is a block diagram illustrating write/read operations implemented by the serial buffer of FIG. 1 in response to a received packet stream having no missing packets.

FIG. 5A is a block diagram illustrating write operations associated with a stream of fifteen sequential packets $P_1$-$P_{15}$. Sequential packets $P_1$-$P_{15}$ are written to the selected queue during sequential time periods $T_1$-$T_{15}$, respectively. In the illustrated example, the water mark of the selected queue is set to a value of '5'. As packets $P_1$-$P_5$ are written to the selected queue, the water level of the selected queue increases from a value of '0' at the beginning of time period $T_1$ to a value of '5' at the end of time period $T_5$. Thus, after packet $P_5$ has been written to the selected queue, the water level (5) reaches the water mark (5). As described above, this causes the first packet $P_1$ to be read from the selected queue during time period $T_6$. The sixth packet $P_6$ is also written into the selected queue during time period $T_6$. The net result of writing the sixth packet $P_6$ (which increments the water level) and reading the first packet $P_1$ (which decrements the water level) is that the water level remains at a value of '5' at the end of time period $T_6$. Packet read and write operations continue in this manner, with the water level remaining at a value of '5' at the end of each time period.

Figure 5B:
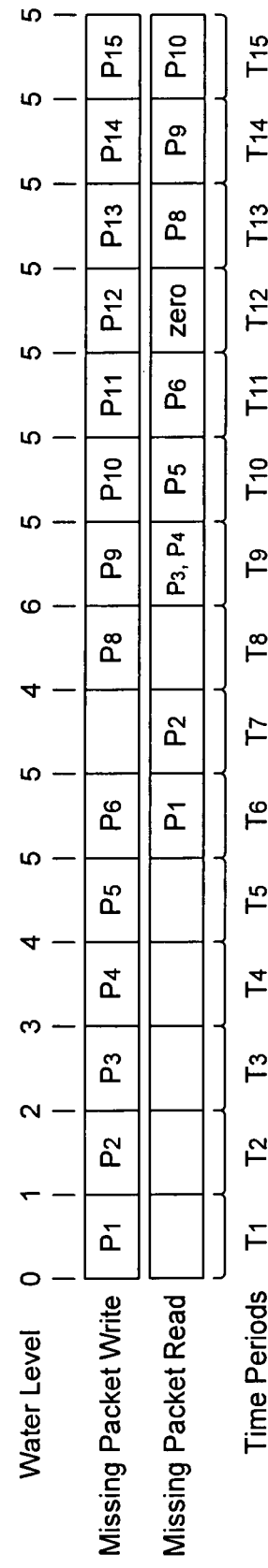
FIG. 5B is a block diagram illustrating write/read operations implemented by the serial buffer of FIG. 1 in response to a received packet stream having a single missing packet.

FIG. 5B is a block diagram illustrating write operations in accordance with one embodiment of the present invention, wherein packets $P_1$-$P_6$ are written to the selected queue during the respective time periods $T_1$-$T_6$, packet $P_7$ is missing during time period $T_7$, and packets $P_8$-$P_{15}$ are written to the selected queue during the respective time periods $T_8$-$T_{15}$. Again, the water mark of the selected queue is set to a value of '5'. Through time period $T_6$, processing proceeds in the same manner described above in connection with FIG. 5A. However, during time period $T_7$, the seventh packet $P_7$ is missing while the second packet $P_2$ is being read out of the selected queue. Because a read operation is performed without a corresponding write operation during time period $T_7$, the water level decreases to a value of '4' at the end of time period $T_7$. Because the water level is less than the water mark, no read operation is performed during the next time period $T_8$.

The eighth packet $P_8$ is received during the next time period $T_8$. The missing packet detection logic 102 determines that a single packet ($P_7$) is missing in the manner described above. While the packet header of the eighth packet $P_8$ is written to the selected queue, missing packet detection logic 102 causes a single missing packet indicator to be stored in an unused bit location of the packet header. Missing packet detection logic 102 also causes the water level of the selected queue to be incremented by two, thereby accounting for the missing packet $P_7$ (which will eventually be read out of the selected queue as a 'zero' packet) and the eighth packet P8. Thus, at the end of time period $T_8$, the water level has a value of '6'.

During the next time period $T_9$, the water level of '6' causes read control logic 103 to read the third and fourth packets $P_3$ and $P_4$ from the selected queue, in the manner described above in connection with FIG. 4. Also during this time period $T_9$, write control logic 101 causes the ninth packet $P_9$ to be written to the selected queue. The two read operations (which decrement the water level by two) and the one write operation (which increments the water level by one) cause the water level to have a value of '5' at the end of time period $T_9$. The water level is maintained at a value of '5' from this point forward. As described above in connection with FIG. 4, the third packet $P_3$ and the fourth packet $P_4$ are read out with an inter-packet gap, which is selected in response to the contents of a packet interval register. This is necessary if a packet pre-processing unit in the target real time application cannot handle back-to-back packets.

At the beginning of time period $T_{12}$, the eighth packet $P_8$ becomes the top packet of the selected queue for read purposes. At this time, the single missing packet indicator previously written to the packet header of the eighth packet $P_8$ is detected causes a 'zero' packet to be provided during time period $T_{12}$, in the manner described above in connection with FIG. 4. Note that the water level of the selected queue is decremented in response to providing this 'zero' packet (and the water level is incremented in response to writing the twelfth packet $T_{12}$), such that the water level remains at '5' at the end of time period $T_{12}$.

The eighth packet $P_8$ is then read out of the selected queue during time period $T_{13}$, in the manner described above in connection with FIG. 4. Note that the thirteenth packet $P_{13}$ is also written to the selected queue during time period T13. In this manner, serial buffer 100 handles the missing packet $P_7$. Note that serial buffer 100 is capable of handling any non-consecutive missing packets in this manner.

Although the present invention has been described in connection with various embodiments, it is understood that variations of these embodiments would be obvious to one of ordinary skill in the art. For example, although the present invention has been described in connection with a data 'unit' having a size equal to one packet, it is understood that other data 'units' may be used in other embodiments. For example, a data 'unit' may have a size equal to a predetermined number of packets in other embodiments. Moreover, it is understood that each of the queues may be individually configured to operate accordance with the present invention. Thus, some of the queues Q0-Q3 may be configured such that single missing packets are replaced with zero packets in the manner described above, while other queues may be configured to ignore missing packets. Moreover, although single missing packets have been replaced with zero packets in the described examples, it is understood that in other embodiments, single missing packets may be replaced with other 'dummy' packets. Thus, the present invention is limited only by the following claims.

We claim:

1. A method of operating a serial buffer to provide a data offload function, the method comprising:
   monitoring an incoming stream of packets to identify single missing packets and multiple consecutive missing packets in the incoming stream of packets;
   interrupting operation of the serial buffer upon identifying multiple consecutive missing packets in the incoming stream of packets;
   inserting a single missing packet identifier into each of the packets that results in the identification of a single missing packet;
   writing the incoming stream of packets, including any inserted single missing packet identifiers, to a queue;
   reading the packets, including any inserted single missing packet identifiers, from the queue to provide an outgoing stream of packets;
   inserting a dummy packet into the outgoing stream of packets in response to each of the packets read from the queue having an inserted single missing packet identifier.

2. The method of claim 1, wherein the step of monitoring the incoming stream of packets to identify single missing packet comprises comparing addresses associated with the packets with expected addresses of the packets.

3. The method of claim 1, wherein the step of inserting a single missing packet identifier comprises writing the single missing packet identifier to an unused location of a packet header.

4. The method of claim 1, wherein the step of reading the packets from the queue is initiated when a water level of the queue reaches a water mark of the queue.

5. The method of claim 4, further comprising incrementing the water level of the queue by two when a single missing packet identifier is inserted into a packet.

6. The method of claim 1, further comprising inserting an interval between packets in the outgoing stream of packets.

7. The method of claim 1, further comprising controlling each dummy packet to have the same predetermined data payload.

8. The method of claim 1, wherein each of the packets in the incoming stream and each of the packets in the outgoing stream have the same size.

9. A serial buffer comprising:
   a first port configured to receive an incoming stream of packets;
   missing packet detection logic coupled to the first port and configured to identify single missing packets in the incoming stream of packets, and in response, insert corresponding single missing packet identifiers into packets that resulted in identification of the single missing packets, wherein the missing packet detection logic includes means for identifying multiple consecutive missing packets in the incoming stream of packets;
   means for interrupting operation of the serial buffer upon identifying multiple consecutive missing packets in the incoming stream of packets;
   write control logic coupled to the first port and the missing packet detection logic, and configured to write the packets, including the inserted single missing packet identifiers, to a queue; and
   read control logic configured to read the packets from the queue, and in response, provide an outgoing stream of packets, the read control logic being configured to insert a dummy packet into the outgoing stream of packets in response to reading a packet having an inserted single missing packet identifier.

10. The serial buffer of claim 9, wherein the first port comprises a serial rapid IO (sRIO) interface.

11. The serial buffer of claim 9, wherein each of the packets in the incoming stream of packets and the outgoing stream of packets has the same size.

12. The serial buffer of claim 9, wherein the missing packet detection logic includes means for incrementing a water level of the queue by two upon inserting a single missing packet identifier.

13. The serial buffer of claim 9, wherein the missing packet detection logic includes comparison logic configured to compare memory addresses of packets in the incoming stream with expected memory addresses.

14. The serial buffer of claim 9, wherein the dummy packet comprises a predetermined data payload.

15. A serial buffer comprising:
   a plurality of queues, each configurable to support or not support missing packet detection, and including a first queue configured to support missing packet detection, and a second queue not configured to support missing packet detection;
   a first port configured to receive an incoming stream of packets, wherein different packets specify different queues of the plurality of queues;
   missing packet detection logic coupled to the first port and configured to identify single missing packets in the incoming stream of packets, wherein the missing packet detection logic is configured to insert single missing packet identifiers into packets that specify the first queue and are associated with single missing packets, and wherein the missing packet detection logic is configured to not insert single packet identifiers into packets that specify the second queue.

* * * * *